US 8,718,449 B2

(12) United States Patent
Beyabani et al.

(10) Patent No.: US 8,718,449 B2
(45) Date of Patent: May 6, 2014

(54) DIGITAL VIDEO RECORDER CONTENT FILTERING

(75) Inventors: Syed Zafar Beyabani, Irving, TX (US); Numaira Siddiqa Tetwale, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1344 days.

(21) Appl. No.: 12/135,516

(22) Filed: Jun. 9, 2008

(65) Prior Publication Data
US 2009/0304350 A1    Dec. 10, 2009

(51) Int. Cl.
*H04N 5/76* (2006.01)
(52) U.S. Cl.
USPC .......................................... 386/291
(58) Field of Classification Search
None
See application file for complete search history.

(56) References Cited

U.S. PATENT DOCUMENTS

| 2003/0007782 A1* | 1/2003  | Kamen .......................... 386/83  |
| 2003/0093790 A1* | 5/2003  | Logan et al. .................... 725/38 |
| 2004/0006767 A1* | 1/2004  | Robson et al. .................. 725/28  |
| 2005/0283535 A1* | 12/2005 | Covell et al. .................. 709/231 |
| 2006/0031870 A1* | 2/2006  | Jarman et al. ................... 725/25 |
| 2006/0095410 A1* | 5/2006  | Ostrover et al. ................. 707/3  |

* cited by examiner

*Primary Examiner* — Brandon Hoffman

(57) ABSTRACT

A system may include a digital video recorder. The digital video recorder may provide a list of recorded television programs, receive selection of a television program in the list of television programs, and receive information identifying a segment to be filtered from the selected television program. The digital video recorder may further create a filtered television program by marking the segment as hidden or deleting the segment, where the segment is not visible when the filtered television program is played, and store the filtered television program.

20 Claims, 18 Drawing Sheets

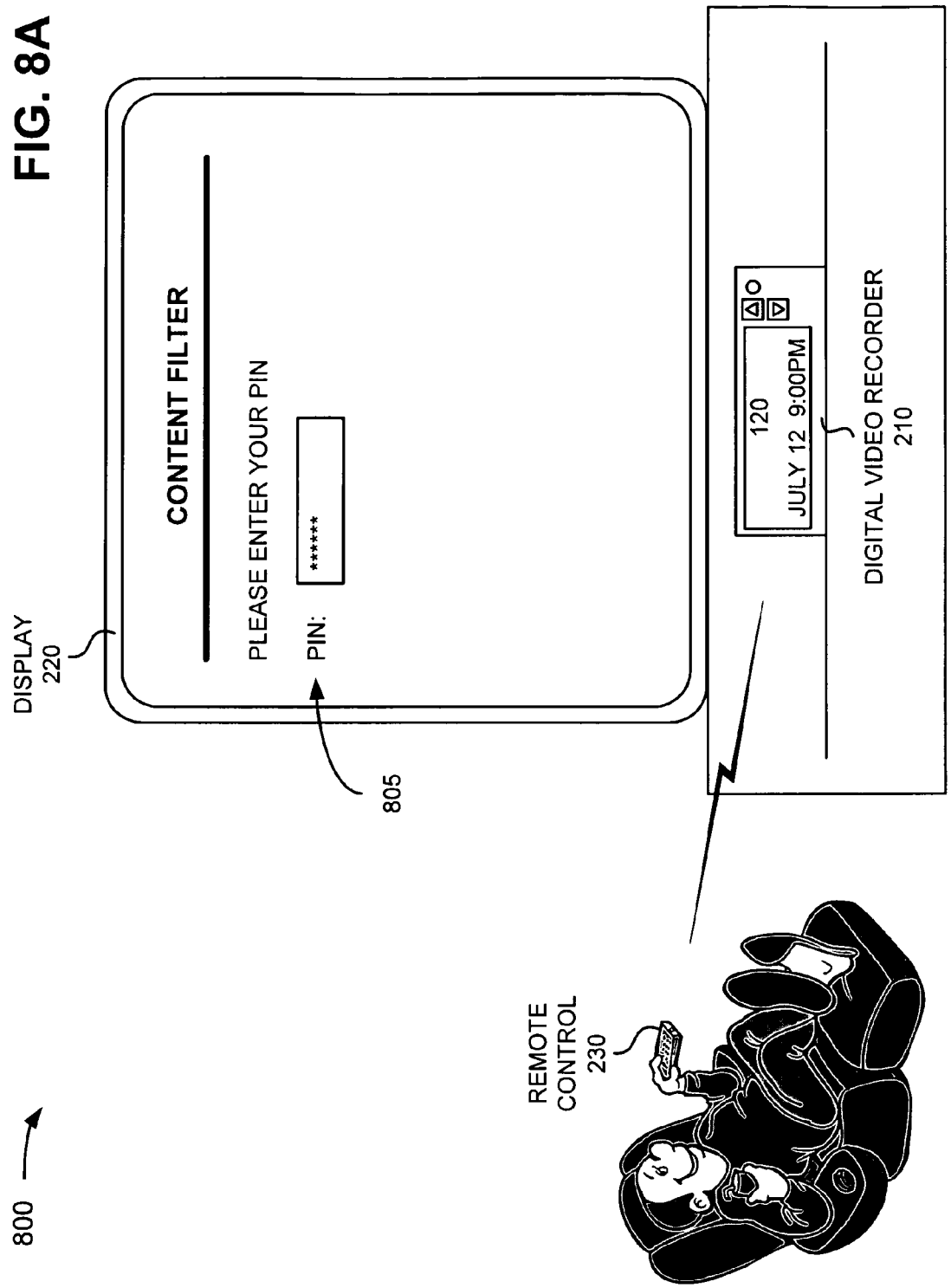

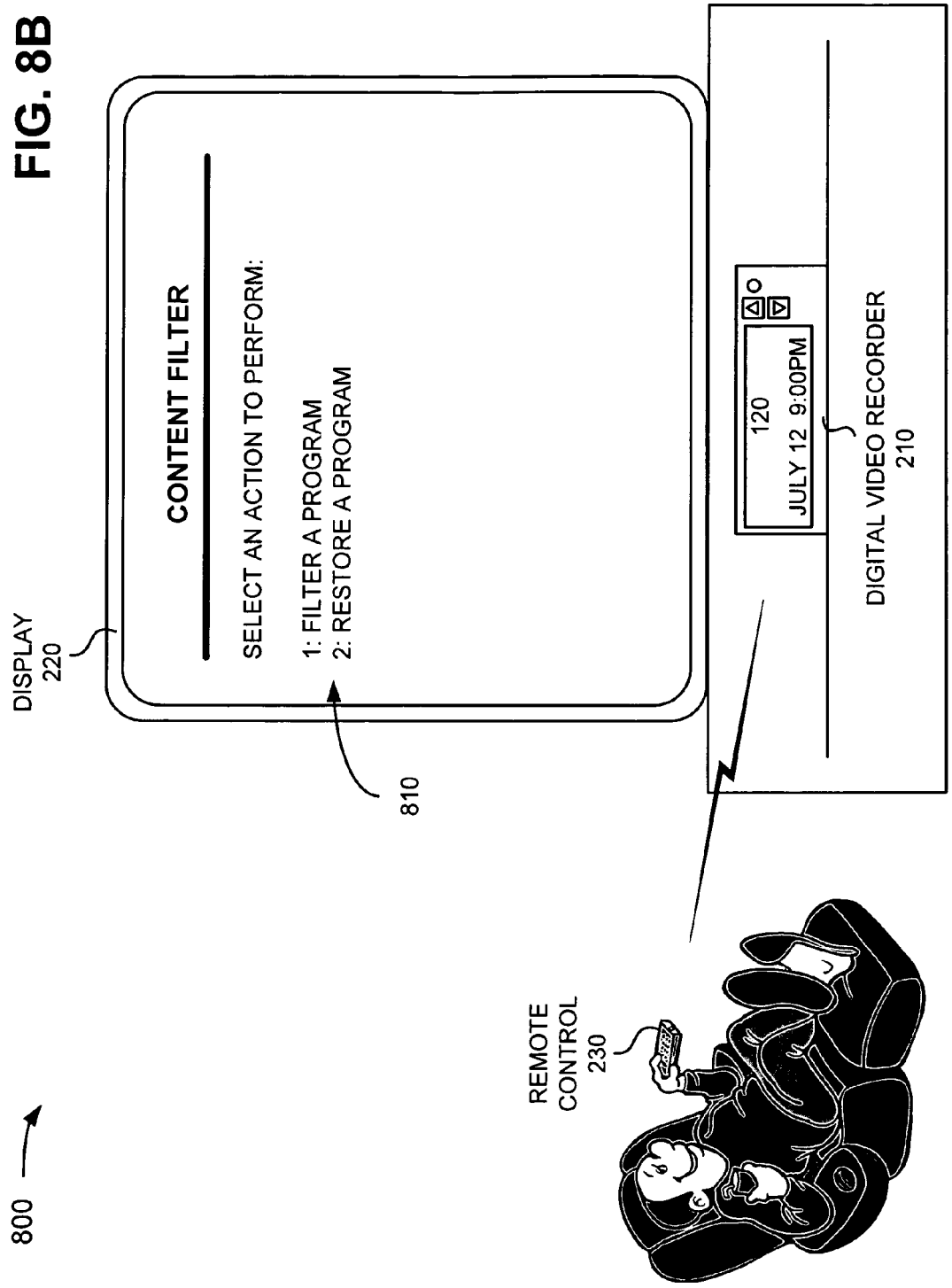

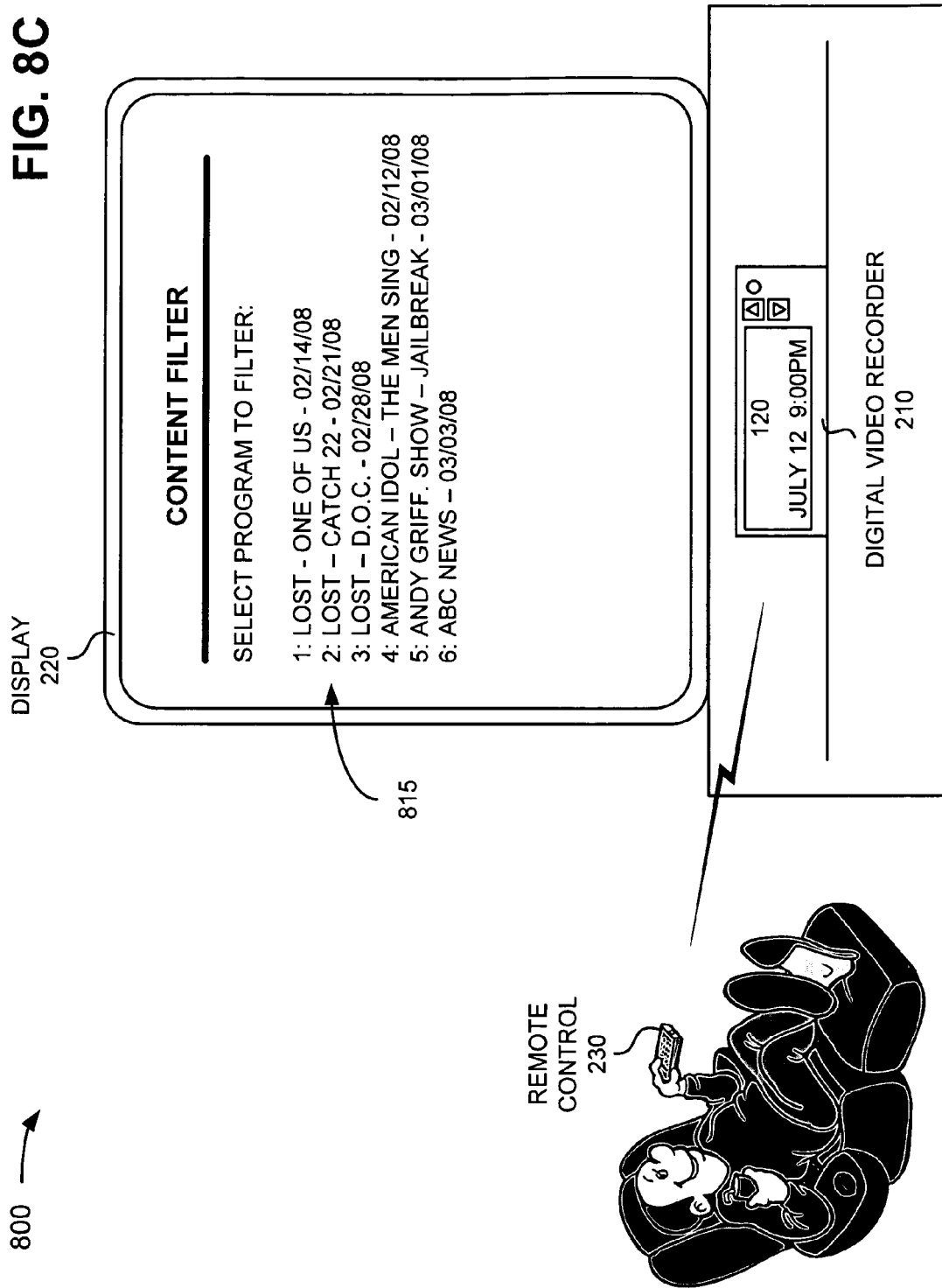

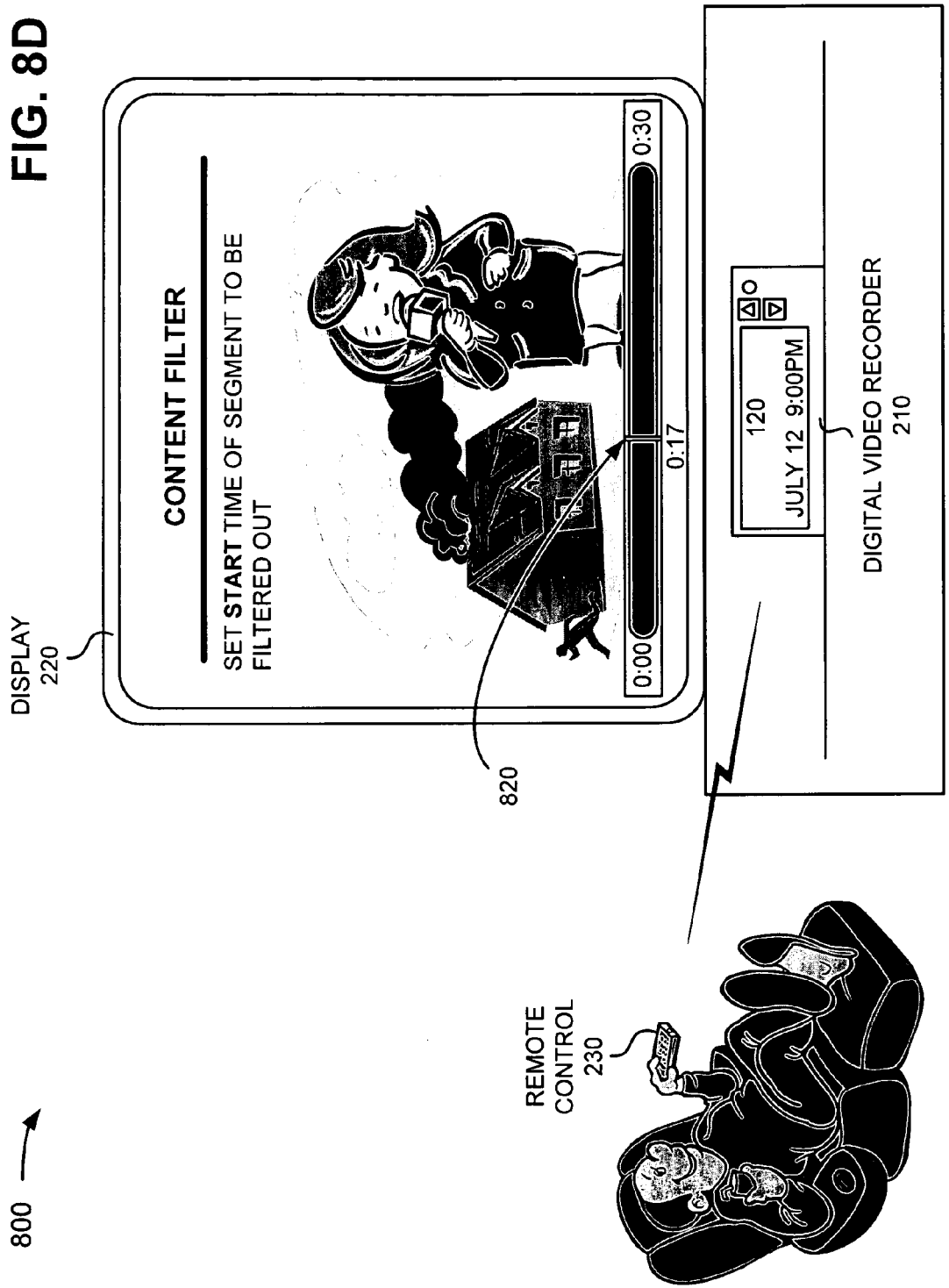

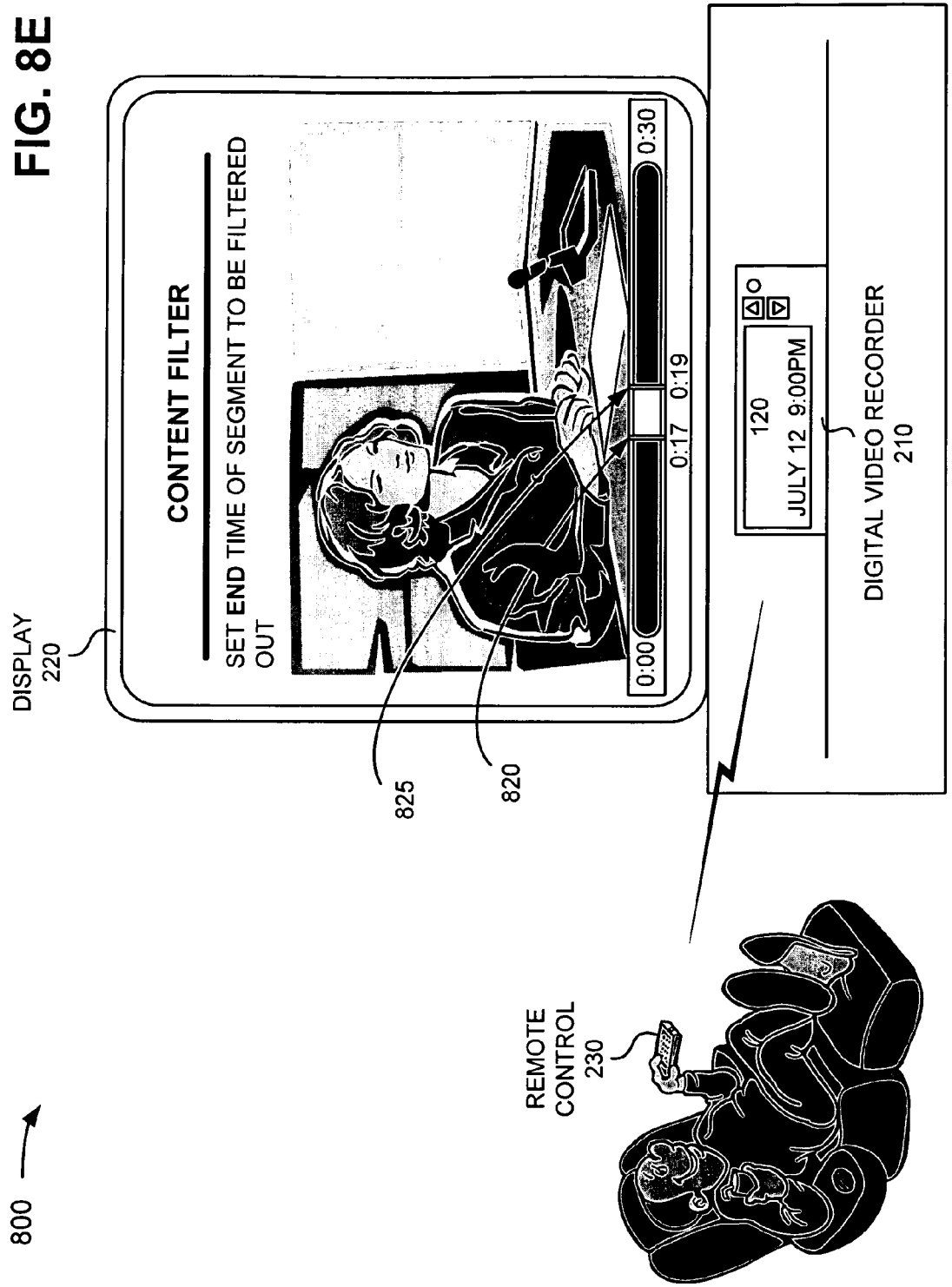

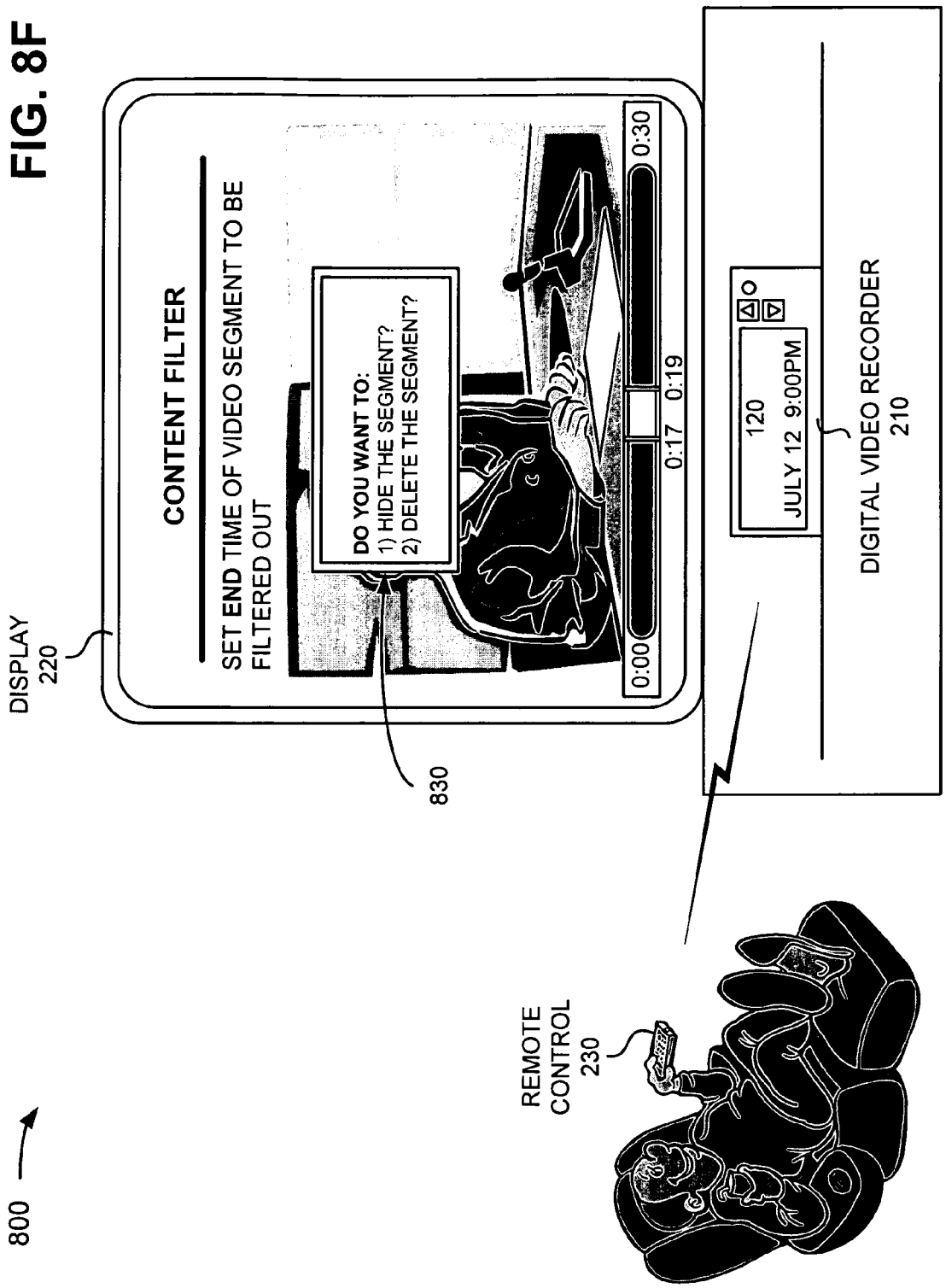

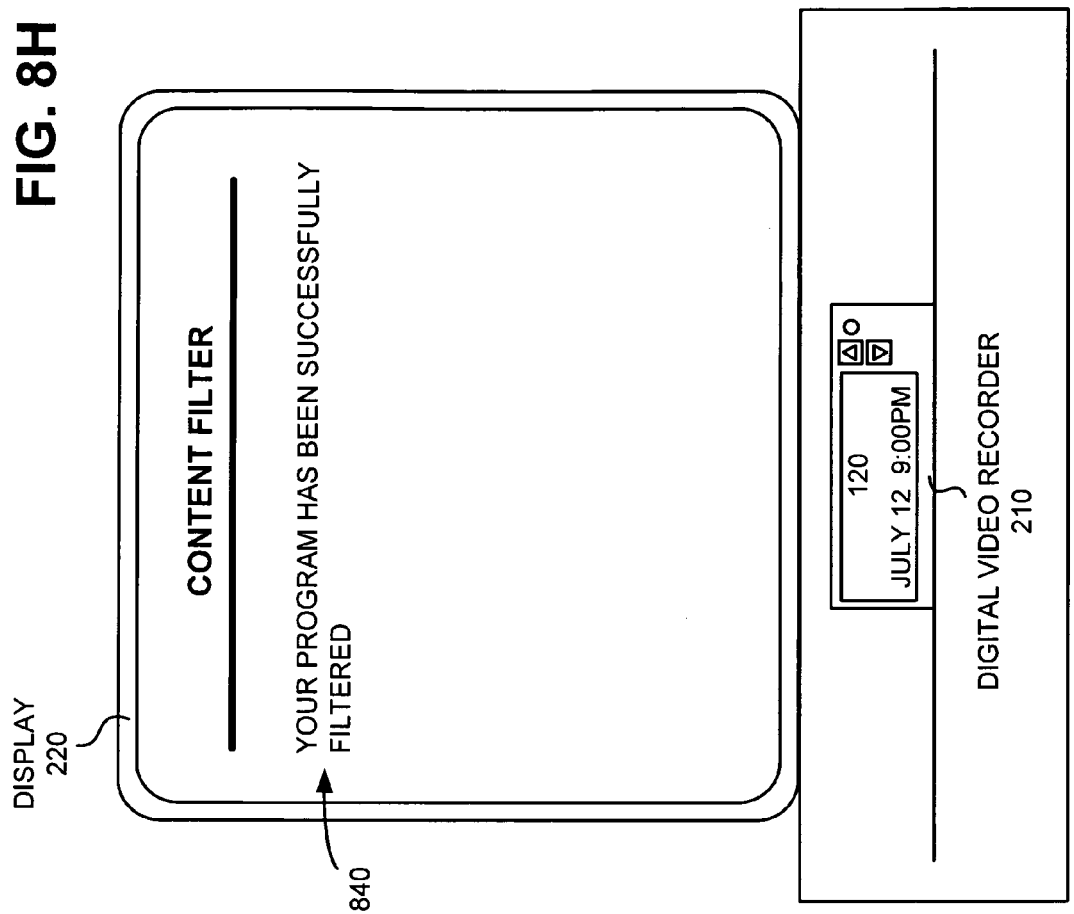

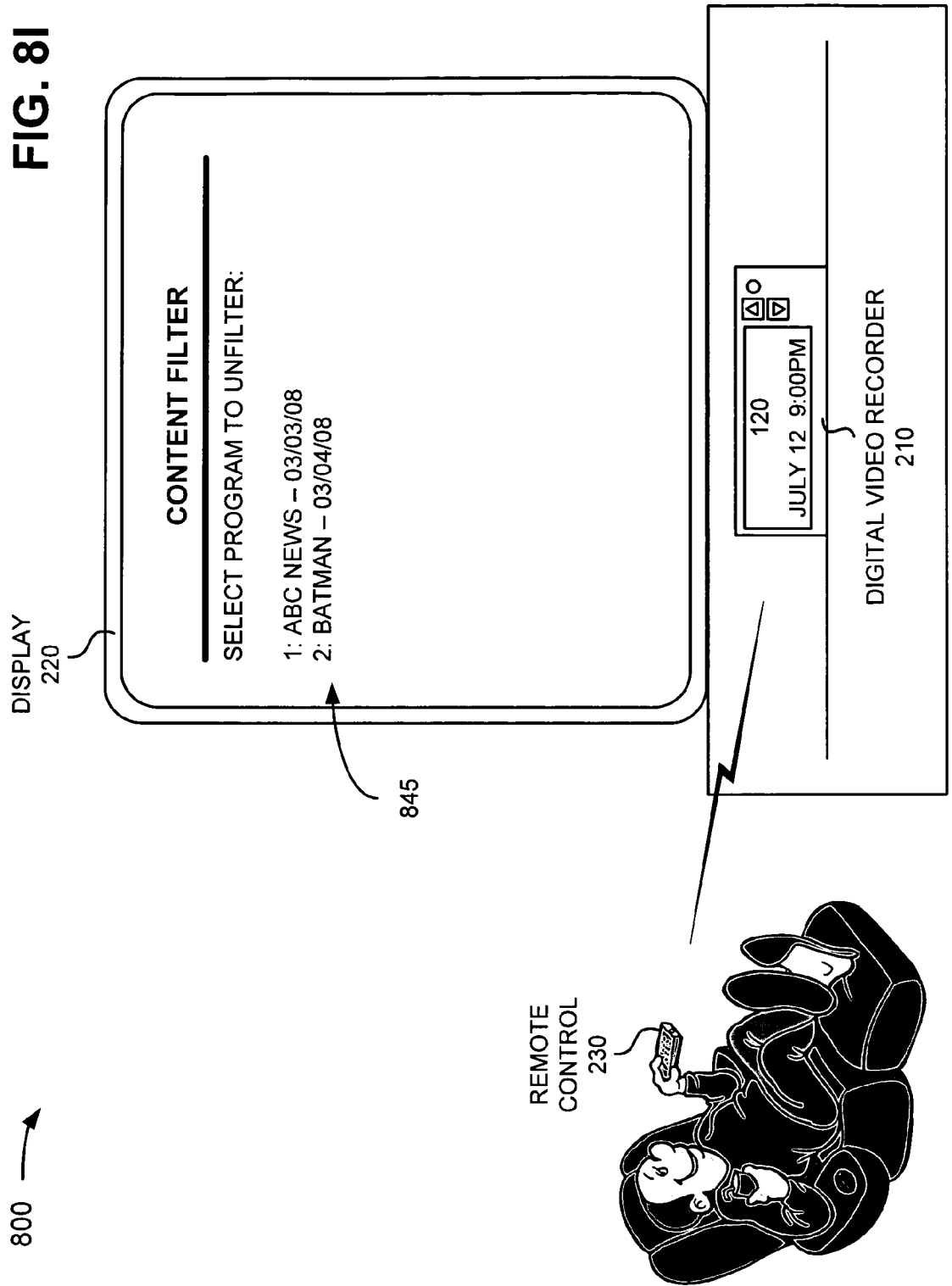

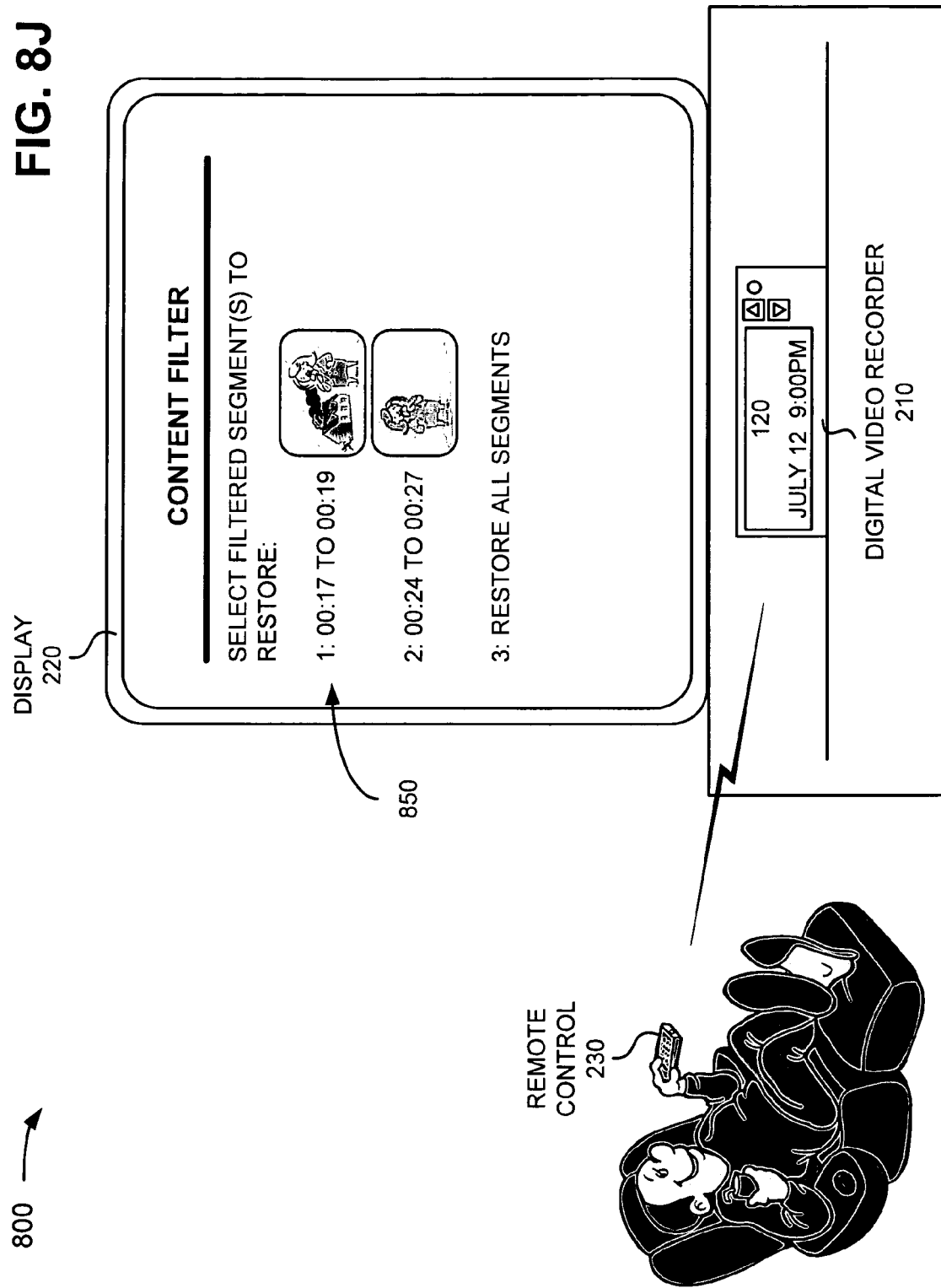

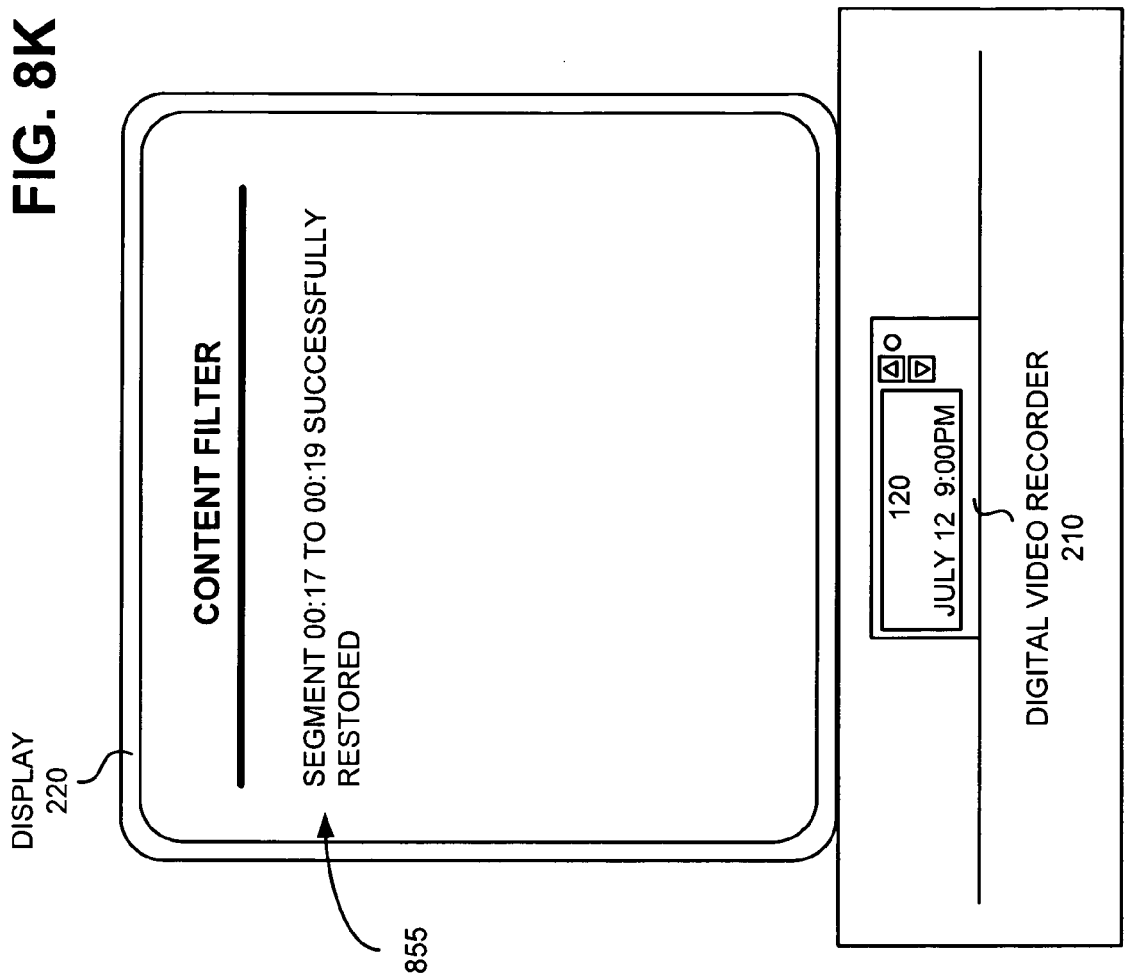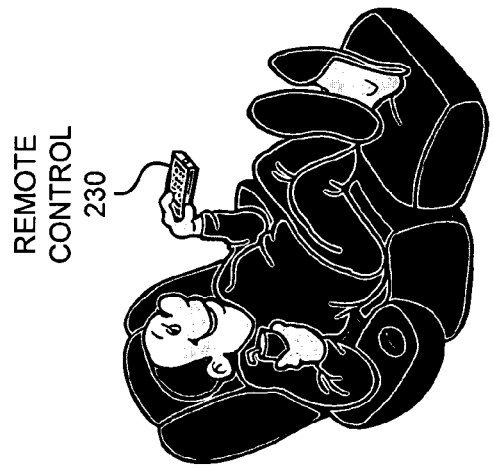

DIGITAL VIDEO RECORDER CONTENT FILTERING

BACKGROUND INFORMATION

Television distribution systems, such as fiber optic networks, cable networks, and digital broadcast satellite networks, provide users with a large number of television programs. At times, television programming may include content that is not suitable for some viewers, such as children.

BRIEF DESCRIPTION OF THE DRAWINGS

FIGS. 8A-8K illustrate an example of the processing described in FIGS. 5 and 7.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1:
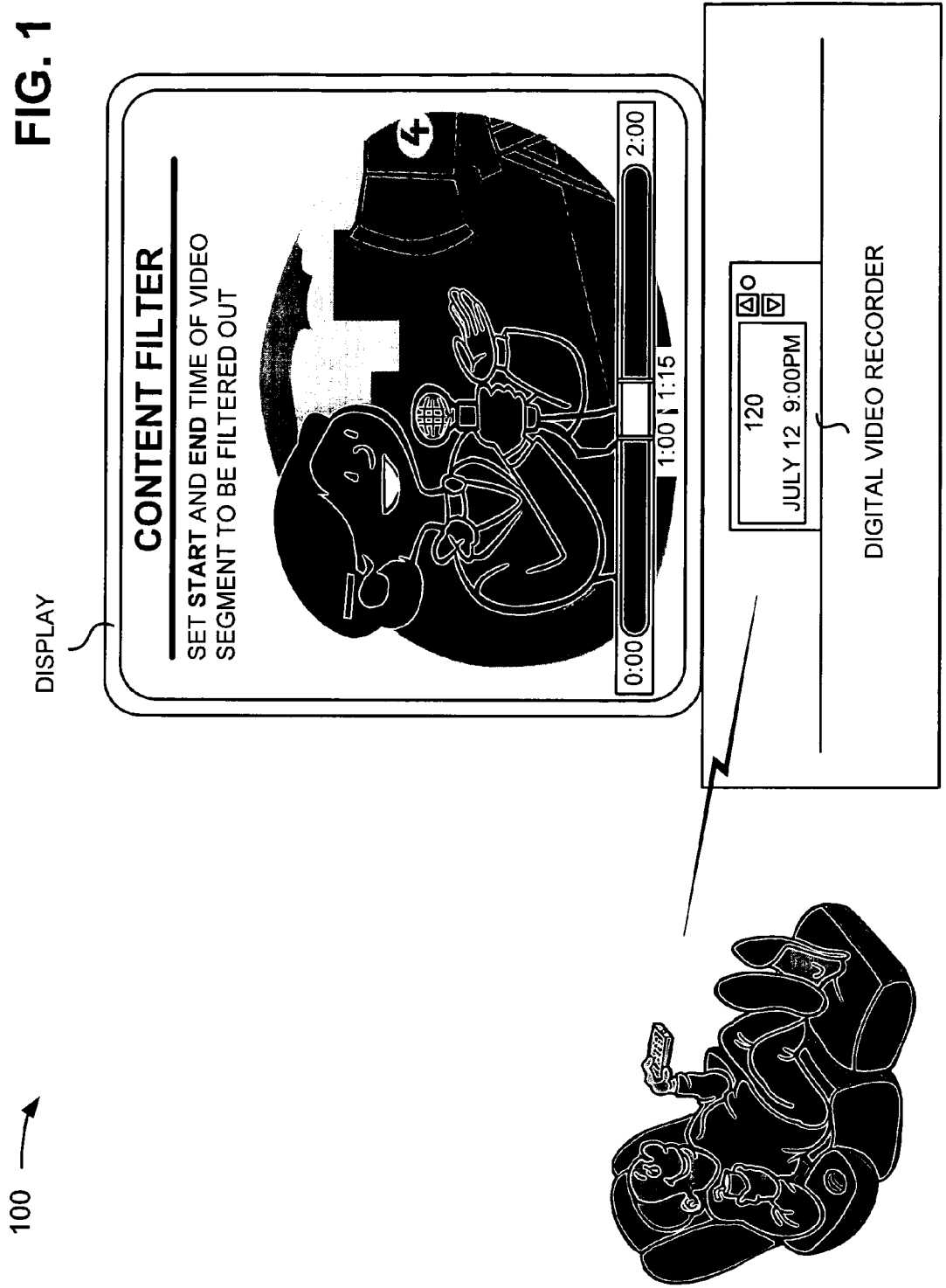
FIG. 1 is an exemplary diagram illustrating a concept described herein.

FIG. 1 is an exemplary diagram illustrating a concept 100 described herein. As illustrated, a digital video recorder may be associated with a display. In one embodiment, the digital video recorder may allow a user to remove one or more segments of a television program. Numerous reasons for wanting to remove a segment from a television program exist. One such reason may include the situation when the user is a parent who wishes to filter out content from a television program (such as a movie) that the user's children want to watch. Thus, as illustrated in FIG. 1, the parent may indicate that a segment of the movie (i.e., the segment from 1 hour into the movie to 1 hour, 15 minutes into the movie) should be hidden or removed. The user may then store the filtered program, which can then be played back in its filtered format, such that the segment is not visible to a viewer of the filtered program.

Figure 2:
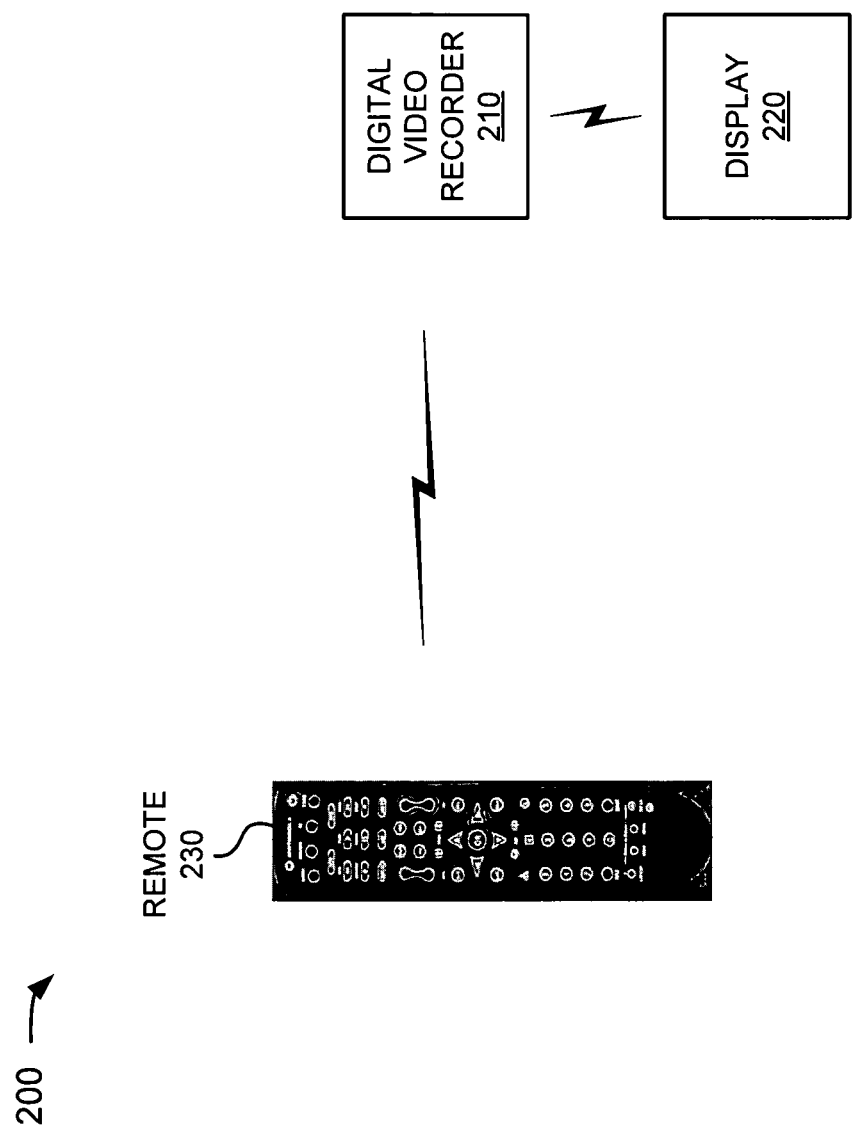
FIG. 2 is an exemplary arrangement in which systems and methods, consistent with exemplary embodiments, may be implemented.

FIG. 2 is an exemplary arrangement in which systems and methods, consistent with exemplary embodiments, may be implemented. As illustrated, arrangement 200 may include a digital video recorder 210, a display 220, and a remote control 230. The number of digital video recorders 210, displays 220, and remote controls 230 illustrated in FIG. 2 is provided for simplicity. In practice, there may be more digital video recorders 210, displays 220, and remote controls 230. Moreover, it will be appreciated that one or more components in FIG. 2 may perform one or more of the tasks described as being performed by one or more other components illustrated in FIG. 2.

Digital video recorder 210 may include a device that receives television programming (which includes any type of content that can be provided to display 220) and provides the television programming to display 220. Digital video recorder 210 may further allow a user to record television programming, filter one or more segments from television programming, restore one or more segments to previously filtered television programming, and/or provide recorded television programming (which may be filtered or unfiltered) to display 220. In one embodiment, digital video recorder 210 may include any type of recorder that may record television programming. In another embodiment, digital video recorder 210 may include a set-top box that may include or be associated with a digital video recorder or another type of recorder, such as a video cassette recorder, an external storage device, or a remote viewing device, such as a Slingbox™ from Sling Media.

Display 220 may include any display that is capable of displaying television programming. For example, display 220 may include a direct view tube television, a plasma television, a liquid crystal display (LCD) television, or a rear or front projection television.

Remote control 230 may include a device capable of remotely controlling the operation of digital video recorder 210 and/or display 220, for example, via the transmission of signals, such as infrared signals. Remote control 230 may include a group of buttons. In one embodiment, remote control 230 may include a button that initiates the filtering of segments from television programming and/or the restoration of segments that have been previously filtered from television programming.

Figure 3:
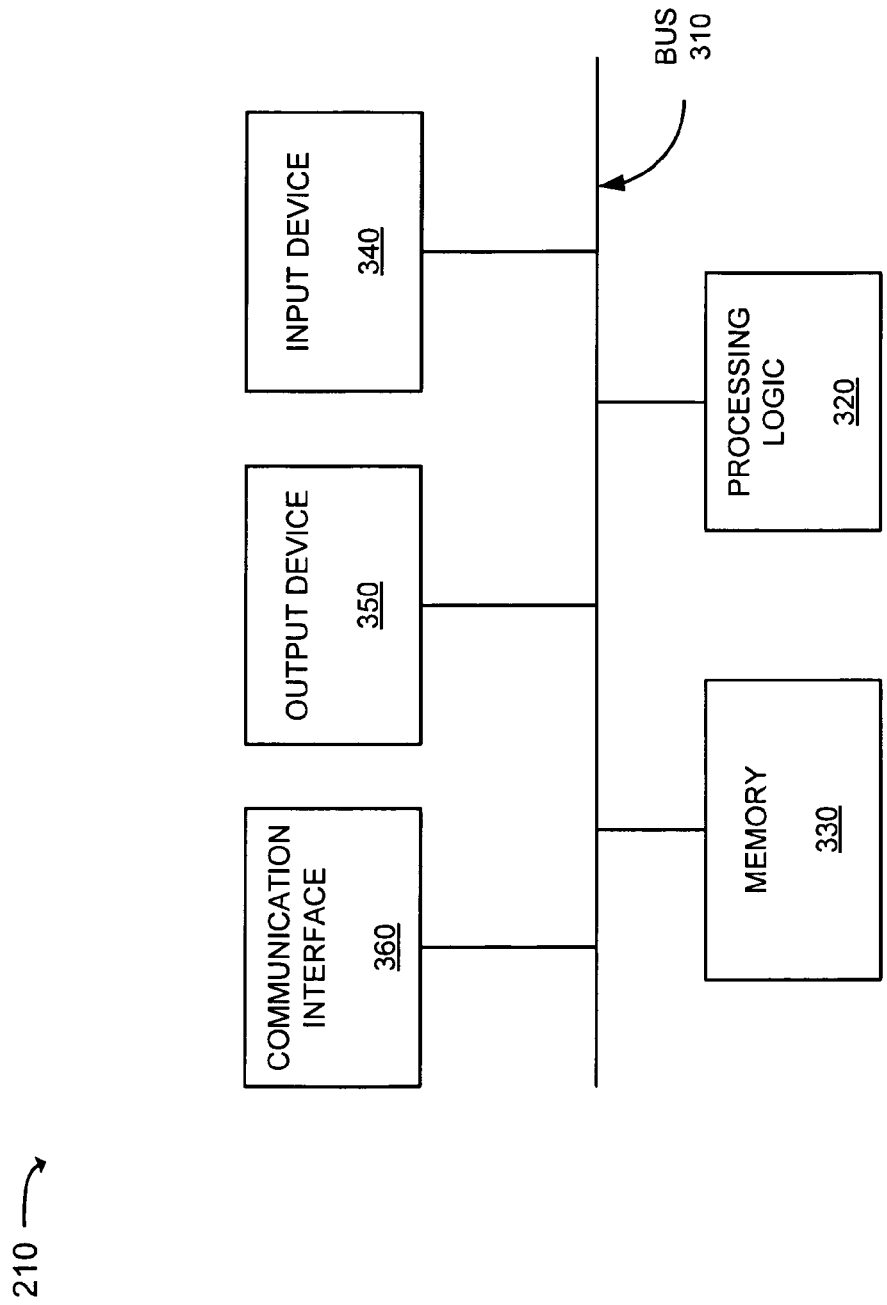
FIG. 3 is an exemplary block diagram of the digital video recorder of FIG. 2.

FIG. 3 is an exemplary block diagram of digital video recorder 210. As illustrated, digital video recorder 210 may include a bus 310, processing logic 320, a memory 330, an input device 340, an output device 350, and a communication interface 360. It will be appreciated that digital video recorder 210 may include additional (or other) components than illustrated in FIG. 3.

Bus 310 may include a path that permits communication among the elements of digital video recorder 210. Processing logic 320 may include a processor, microprocessor, or other type of processing logic, such as an application specific integrated circuit (ASIC), field programmable gate array (FPGA), etc., that may interpret and execute instructions. Memory 330 may include a random access memory (RAM) or another type of dynamic storage device that may store information and instructions for execution by processing logic 320, read only memory (ROM) or another type of static storage device that may store static information and instructions for use by processing logic 320, and/or another type of storage device.

Input device 340 may include a mechanism that permits an operator to input information to digital video recorder 210, such as buttons or a touch-screen interface. Output device 350 may include a mechanism that outputs information to the operator, such as a display. Communication interface 360 may include any transceiver-like mechanism that enables digital video recorder 210 to receive and/or send information from/to other devices and/or systems, such as display 220, remote control 230, one or more entertainment components (e.g., a speaker, a video recorder, etc.), etc.

As will be described in detail below, digital video recorder 210 may perform certain operations. Digital video recorder 210 may perform these and other operations, in response to processing logic 320 executing software instructions contained in a computer-readable medium, such as memory 330. A computer-readable medium may be defined as a physical or logical memory device.

The software instructions may be read into memory 330 from another computer-readable medium or from another device via communication interface 360. The software instructions contained in memory 330 may cause processing logic 320 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Figure 4:
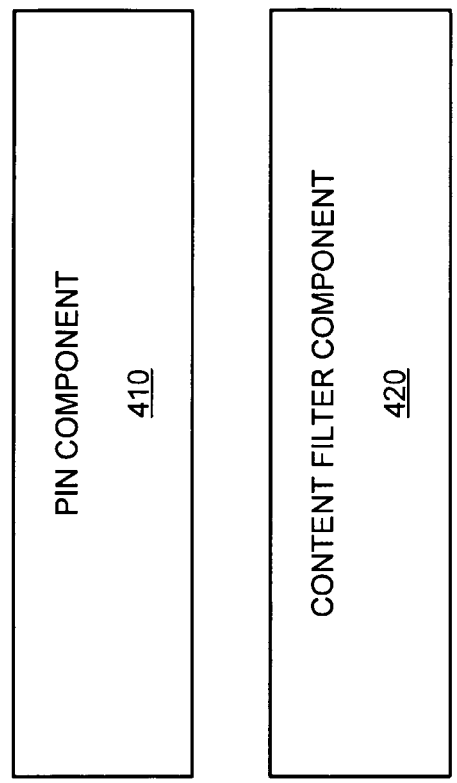
FIG. 4 is an exemplary functional diagram of a portion of the digital video recorder of FIG. 2.

FIG. 4 is an exemplary functional diagram of a portion of digital video recorder 210 according to an exemplary embodiment. As illustrated, digital video recorder 210 may include a personal identification number (PIN) component 410 and a content filter component 420. It will be appreciated that digital video recorder 210 may include other modules (not shown) that aid in filtering out a segment from and/or restoring a segment to television programming.

PIN component 410 may store one or more personal identification numbers and use the one or more personal identification numbers to authenticate a user that is attempting to filter or otherwise edit television programming. The personal identification numbers may include a sequence of characters, e.g., alphanumeric characters. PIN component 410 may receive a personal identification number from a user via remote control 230. In one embodiment, different PINs may have different levels of authorization to perform television programming editing. For example, a user associated with one PIN may only be capable of removing (by either hiding or permanently deleting) segments of television programming, while a user associated with another PIN may be capable of not only removing segments of television programming, but also restoring segments of previously filtered television programming.

Content filter component 420 may allow a user to edit television programming by, for example, hiding one or more segments of the television programming, deleting one or more segments of the television programming, and/or restoring one or more segments of the television programming. Content filter component 420 may provide one or more graphical user interfaces that allow the user to edit the television programming.

Figure 5:
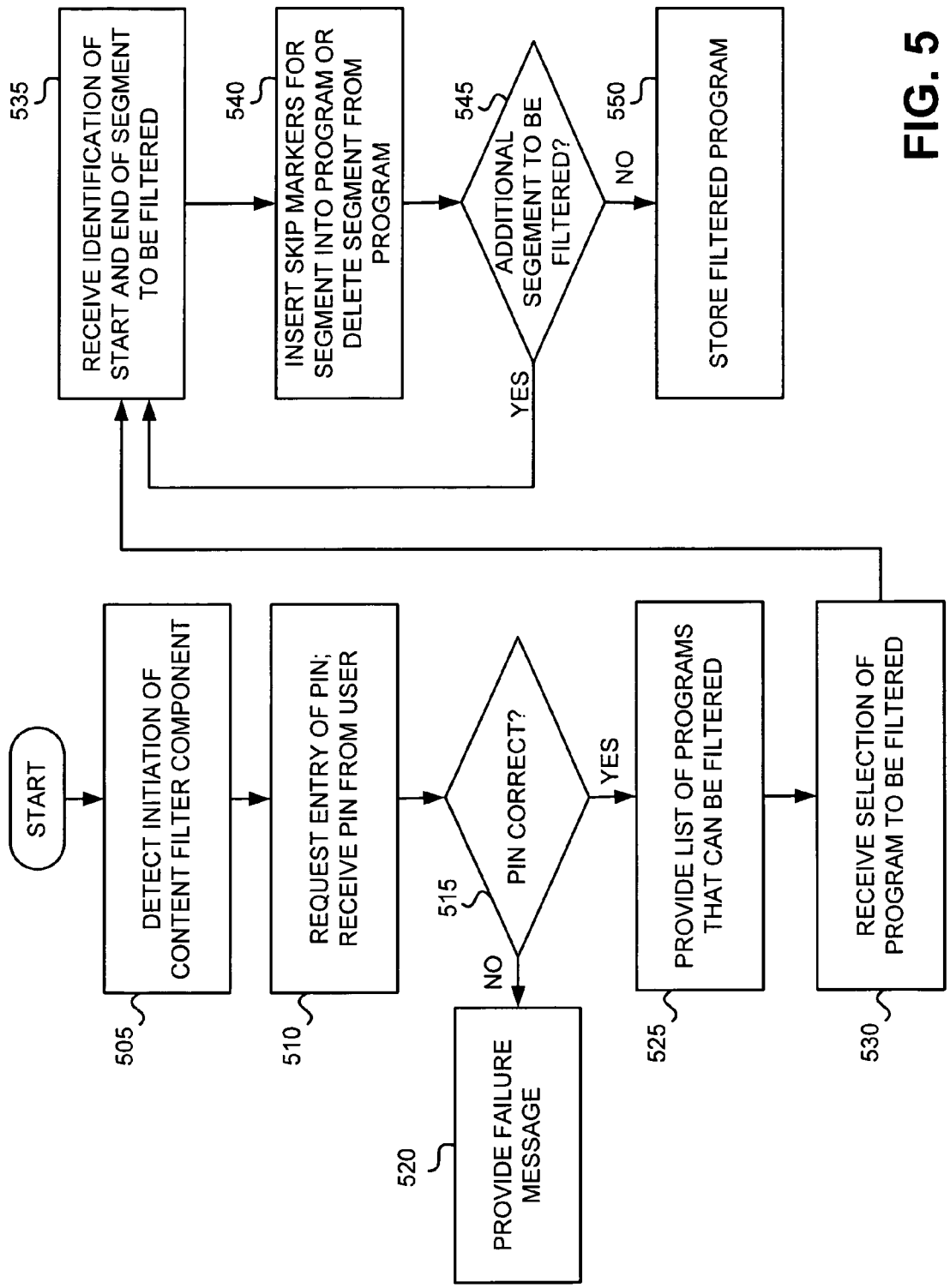
FIG. 5 is a flow chart of exemplary processing for filtering one or more segments of a television program.

FIG. 5 is a flow chart of exemplary processing for filtering one or more segments of a television program. In one embodiment, the processing of FIG. 5 may be performed by digital video recorder 210. In another embodiment, some or all of the processing described below may be performed by another device or combination of devices, such as a back end device located remote from digital video recorder 210.

Processing may begin with digital video recorder 210 detecting the initiation of a content filter component, such as content filter component 420 (block 505). A user may initiate content filter component 420 by, for example, pressing a particular button or buttons on remote control 230, by pressing a particular button or buttons on digital video recorder 210, by interacting with a graphical user interface provided by digital video recorder 210, and/or via another technique.

Digital video recorder 210 may request entry of a personal identification number (block 510). In one embodiment, digital video recorder 210 may provide a graphical user interface to display 220 in response to detecting the initiation of content filter component 420 that may allow the user to enter the personal identification number. The user may enter the personal identification number using, for example, remote control 230.

Upon receipt of a personal identification number from the user (block 510), digital video recorder 210 may determine whether the personal identification number is correct (block 515). For example, digital video recorder 210 may compare the received personal identification number to a stored personal identification number (e.g., stored by PIN component 410). If digital video recorder 210 determines that the received personal identification number does not match a stored personal identification number (block 515—NO), digital video recorder 210 may provide a failure message to the user (block 520). For example, digital video recorder 210 may cause a notification to be displayed on display 220 indicating that the personal identification number is incorrect. In one embodiment, processing may return to block 510 with digital video recorder 210 again requesting entry of a personal identification number.

If, on the other hand, digital video recorder 210 determines that the received personal identification number matches a stored personal identification number (block 515—YES), digital video recorder 210 may provide a list of television programs that can be filtered (block 525). For example, digital video recorder 210 may provide a list of all or a portion of the television programs that have been recorded by digital video recorder 210 (or accessible to digital video recorder 210). The particular television programs to provide in the list may be user configurable. As one example, the list of television programs may include only those television programs associated with a particular rating (e.g., according to the "TV Parental Guidelines") or those television programs that are associated with specific ratings (e.g., only those programs rated TV PG, TV 14, or TV MA). In another example, the list of television programs may include only those television programs recorded from one or more designated channels. In yet another example, the list of television programs may include only those television programs that contain a particular type or types of content, such as graphic violence (V), explicit sexual activity (S), crude indecent language (L), suggestive dialog (D), etc.

Digital video recorder 210 may receive selection of a television program from the list of television programs (block 530). For example, the user may select a television program to filter from the list of television programs via remote control 230 or an input device 340 of digital video recorder 210.

Digital video recorder 210 may receive information identifying the start and end of a segment of the selected television program to be filtered (block 535). In one embodiment, the user may enter the start and end time of the segment via remote control 230. In another embodiment, digital video recorder 210 may begin playing the selected television program. The user may pause, rewind, fast-forward, and play the selected television program in order to mark the start and end of the segment to be filtered.

Once the segment has been identified, digital video recorder 210 may insert skip markers for the segment into the selected television program or delete the segment from the selected television program (block 540). For example, digital video recorder 210 may allow the user to indicate whether the identified segment is to be skipped (or hidden) when played (providing the user with the ability to restore the segment) or permanently deleted. If the segment is to be skipped, digital video recorder 210 may insert skip markers into the selected television program that cause the segment to be skipped when played back, e.g., by digital video recorder 210. For example, a start skip marker may be inserted at the beginning of the segment and an end skip marker may be inserted at the end of the segment. If the segment is to be deleted, digital video recorder 210 may delete the segment from the television program.

Digital video recorder 210 may determine whether additional segments of the television program are to be filtered (block 545). Digital video recorder 210 may cause a graphical user interface to be provided to the user that allows the user to perform further filtering of the television program. The user may provide an indication of whether or not an additional segment is to be filtered to digital video recorder 210 using, for example, remote control 230.

If the user indicates that an additional segment is to be filtered (block 545—YES), processing may return to block 535 with digital video recorder 210 receiving identification of a start and end of another segment of the television program.

If, on the other hand, the user indicates that no additional segments are to be filtered (block 545—NO), digital video recorder 210 may store the filtered television program (block 550). For example, digital video recorder 210 may store the filtered television program with skip markers indicating one or more segments are to be skipped when the television program is played back or with one or more segments deleted from the television program. Digital video recorder 210 may store the filtered television program in, for example, memory 330 or another storage device associated with or accessible to digital video recorder 210.

Figure 6:
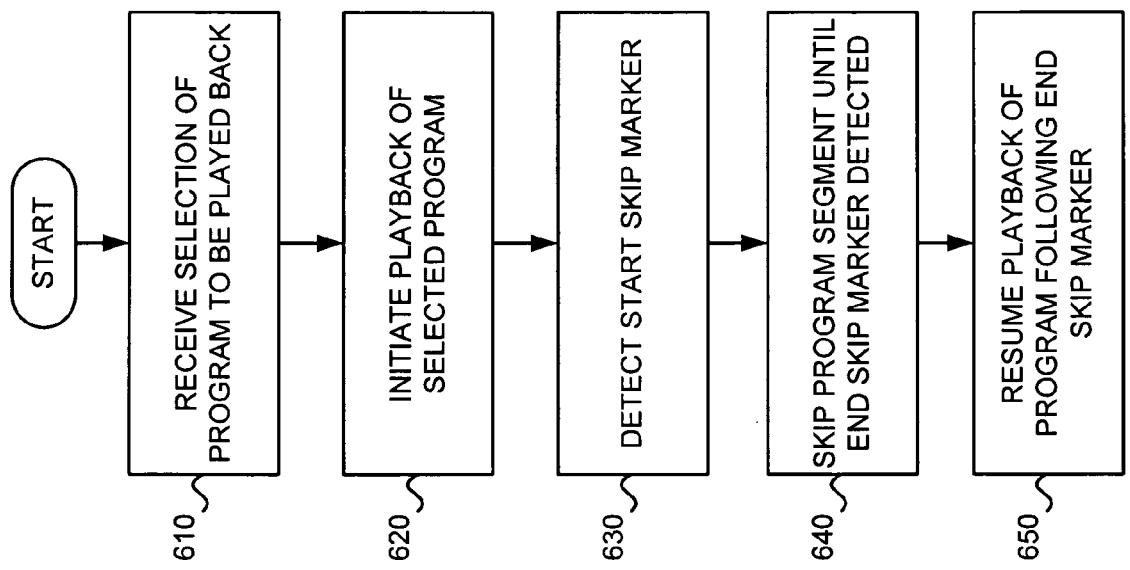
FIG. 6 is a flow chart of exemplary processing for providing a filtered television program to a user.

FIG. 6 is a flow chart of exemplary processing for providing a filtered television program to a user according to an exemplary embodiment. In one embodiment, the processing of FIG. 6 may be performed by digital video recorder 210. In another embodiment, some or all of the processing described below may be performed by another device or combination of devices Processing may begin with digital video recorder 210 receiving a selection of a television program to be played (block 610). Digital video recorder 210 may provide a list of television programs to the user (e.g., in response to a command from the user). In one embodiment, the list of programs that is provided may be configurable. As one example, the list of television programs may include only those television programs associated with a particular rating or group of ratings (e.g., according to the "TV Parental Guidelines"), such as only those television programs rated TV Y or TV G. In another example, the list of television programs may include only those television programs recorded from one or more designated channels. In yet another example, the list of television programs may include only those television programs that do not contain a particular type or types of content, such as graphic violence (V), explicit sexual activity (S), crude indecent language (L), suggestive dialog (D), etc.

The user may select a desired television program to watch using, for example, remote control 230. Assume for this process that the user selects a television program that includes skip markers that have been inserted in the manner described above with respect to FIG. 5.

Digital video recorder 210 may initiate playback of the selected television program (block 620). For example, digital video recorder 210 may cause the television program to be streamed to display 220 in a known manner. During playback, digital video recorder 210 may detect a start skip marker, indicating that a segment in the television program is to be skipped (block 630). As indicated above, a user may designate a segment of the television program to be skipped, which may cause start and end skip markers to be inserted into the television program. Thus, digital video recorder 210 may play back the program until a start skip marker is encountered.

Digital video recorder 210 may skip through the television program until the end skip marker is detected (block 640), where digital video recorder 210 may then resume playback of the television program following the end skip marker (block 650). In one embodiment, the playback of the television program while a segment is being skipped may not be noticeable by the user watching the television program (e.g., the user may not know that a segment has been skipped). In another embodiment, digital video recorder 210 may visually and/or audibly provide an indication to the user to indicate that a segment has been or is being skipped. The user may configure digital video recorder 210 to either provide the indication or not provide the indication.

Figure 7:
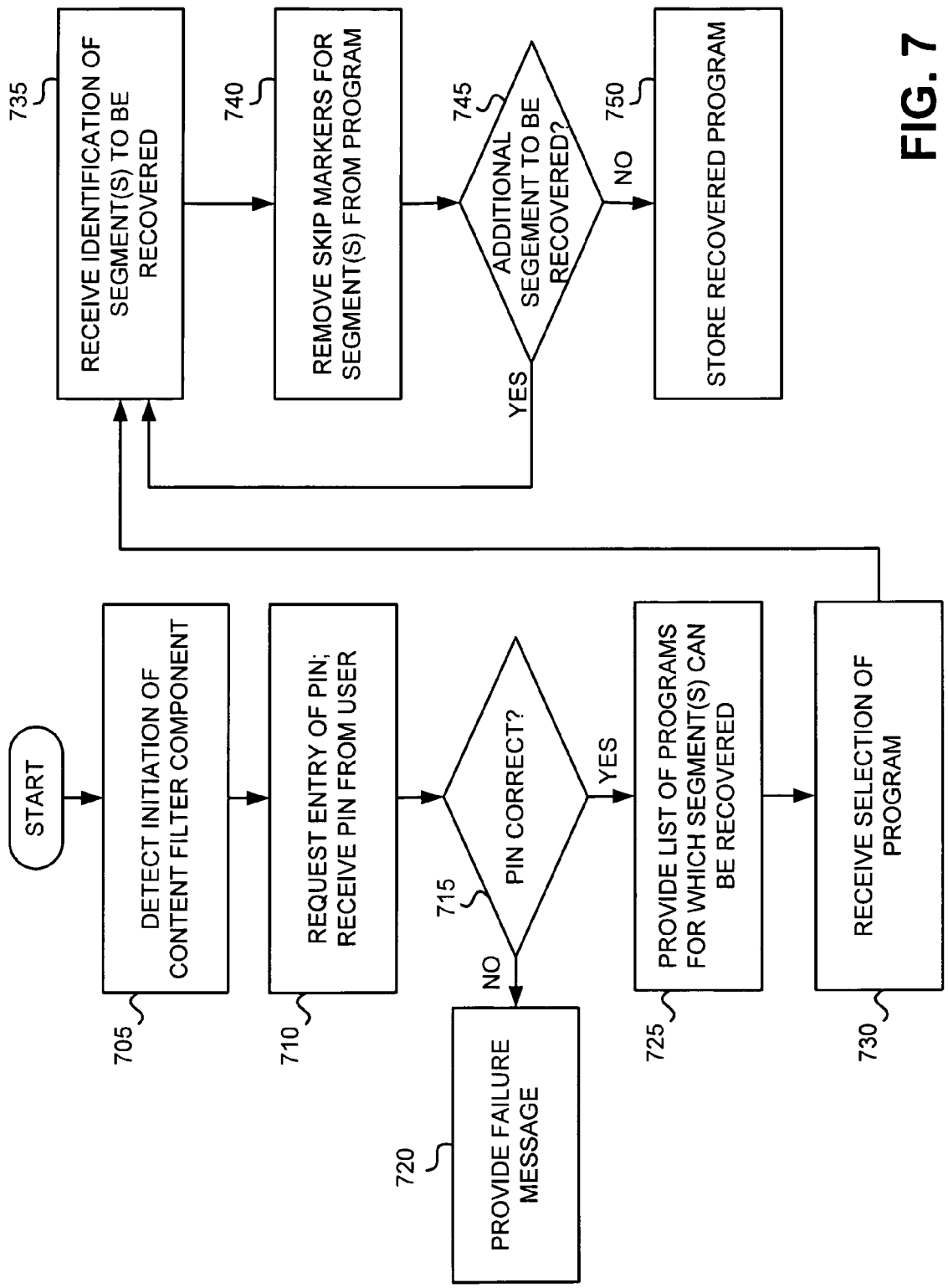
FIG. 7 is a flow chart of exemplary processing for restoring one or more segments of a filtered television program.

FIG. 7 is a flow chart of exemplary processing for restoring one or more segments of a filtered television program. In one embodiment, the processing of FIG. 7 may be performed by digital video recorder 210. In another embodiment, some or all of the processing described below may be performed by another device or combination of devices.

Processing may begin with digital video recorder 210 detecting the initiation of a content filter component, such as content filter component 420 (block 705). A user may initiate content filter component 420 by, for example, pressing a particular button or buttons on remote control 230, by pressing a particular button or buttons on digital video recorder 210, by interacting with a graphical user interface provided by digital video recorder 210, and/or via another technique.

Digital video recorder 210 may request entry of a personal identification number (block 710). In one embodiment, digital video recorder 210 may provide a graphical user interface to display 220 in response to detecting the initiation of content filter component 420 that may allow the user to enter the personal identification number. The user may enter the personal identification number using, for example, remote control 230.

Upon receipt of a personal identification number from the user (block 710), digital video recorder 210 may determine whether the personal identification number is correct (block 715). For example, digital video recorder 210 may compare the received personal identification number to a stored personal identification number (e.g., stored by PIN component 410). If digital video recorder 210 determines that the received personal identification number does not match a stored personal identification number (block 715—NO), digital video recorder 210 may provide a failure message to the user (block 720). For example, digital video recorder 210 may cause a notification to be displayed on display 220 indicating that the personal identification number is incorrect. In one embodiment, processing may return to block 710 with digital video recorder 210 again requesting entry of a personal identification number.

If, on the other hand, digital video recorder 210 determines that the received personal identification number matches a stored personal identification number (block 715—YES), digital video recorder 210 may provide a list of television programs that have been filtered and for which segment(s) may be recovered (block 725). For example, digital video recorder 210 may provide a list of all or a portion of the television programs that have been filtered by digital video recorder 210.

Digital video recorder 210 may receive selection of a television program from the list of television programs (block 730). For example, the user may select a television program for which a segment or segments are to be recovered from the list of television programs via remote control 230 and or an input device 340 of digital video recorder 210.

Digital video recorder 210 may receive information identifying a segment or segments to be recovered for the selected television program (block 735). In one embodiment, digital video recorder 210 may provide a list of segments that can be recovered for the selected television program. The list may, for example, include information identifying the segments by their start and end times. In one embodiment, each segment may be playable, allowing the user to view the segment prior to deciding whether to recover that segment.

Once a segment to be recovered has been identified, digital video recorder 210 may remove the skip markers for the segment from the selected television program (block 740). Digital video recorder 210 may determine whether an additional segment of the television program is to be recovered (block 745). Digital video recorder 210 may cause a graphical user interface to be provided to the user that allows the user to perform further segment recovery for the television program. The user may provide an indication of whether or not an additional segment is to be recovered to digital video recorder 210 using, for example, remote control 230.

If the user indicates that an additional segment is to be recovered (block 745—YES), processing may return to block 735 with digital video recorder 210 receiving identification of another segment of the television program to be recovered.

If, on the other hand, the user indicates that no additional segments are to be recovered (block 745—NO), digital video recorder 210 may store the recovered television program (block 750). For example, digital video recorder 210 may store the recovered television program in, for example, memory 330 or another storage device associated with or accessible to digital video recorder 210.

Figure 8G:
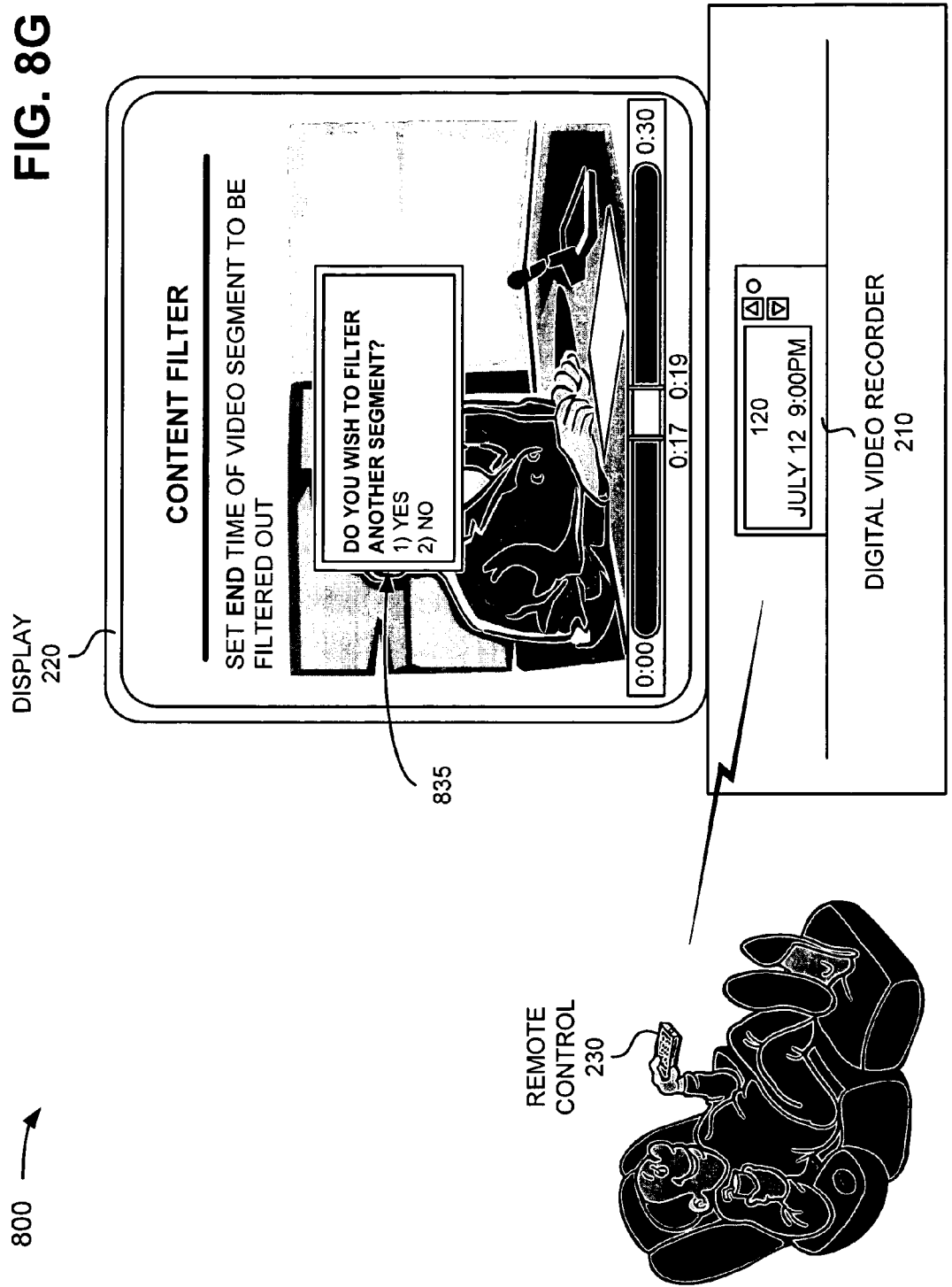

The following example 800 of FIGS. 8A-8K illustrates the processing described above with respect to FIGS. 5 and 7. Assume, for the purposes of example 800, that the user has provided an indication that the user desires to filter a television program. For example, the user may select a button or a sequence of buttons on remote control 230 to initiate content filter component 420. In response to initiating content filter component 420, assume, as illustrated in FIG. 8A, that digital video recorder 210 may provide a graphical user interface 805 that requests that the user enter a personal identification number (PIN). The user may enter the personal identification number using remote control 230. Upon entry of a personal identification number that matches a personal identification stored by PIN component 410, digital video recorder 210 may provide a graphical user interface 810 that allows the user to select an action to perform, as illustrated in FIG. 8B. As illustrated, content filter component 420 may allow the user to filter a television program or restore a television program. Assume that the user selects the filter a television program option.

In response, digital video recorder 210 may retrieve a list of television programs and may provide the list of television programs in a graphical user interface 815, as illustrated in FIG. 8C. Assume that the user selects item 6 (ABC NEWS) from the list using remote control 230. In response, digital video recorder 210 may begin playing back the selected television program, as illustrated in FIG. 8D. The user may interact with digital video recorder 210 (e.g., by fast-forwarding, pausing, rewinding, playing, etc. the television program) to arrive at a beginning of a segment of the television program to be filtered. As illustrated in FIG. 8D, assume that the user has set a start time 820 of the segment to be filtered out at 17 minutes into the television program. The user may continue interacting with digital video recorder 210 (e.g., by fast-forwarding, pausing, rewinding, playing, etc. the television program) to arrive at an end of a segment of the television program to be filtered. As illustrated in FIG. 8E, assume that the user has set an end time 825 of the segment to be filtered out at 19 minutes into the television program. Thus, the user has indicated that a segment starting at 17 minutes into the television program until 19 minutes into the television program is to be filtered out.

Upon identification of the start and end of the segment, digital video recorder 210 may request that the user identify how the segment is to be filtered. For example, as illustrated in FIG. 8F, digital video recorder 210 may cause a pop-up window 830 to be provided on display 220 asking the user whether the segment is to be hidden or deleted. As indicated above, the user may hide a segment of the television program (allowing the segment to be later restored) or permanently deleted. In example 800, assume that the user has elected to hide the segment (allowing the segment to be later restored, if desired).

Digital video recorder 210 may determine whether any additional segments of the television program are to be filtered. For example, digital video recorder 210 may, as illustrated in FIG. 8G, cause a pop-up window 835 to be provided on display 220 asking the user whether another segment of the television program is to be filtered. The user may indicate whether or not an additional segment is to be filtered using, for example, remote control 230.

Assume, for example 800, that the user has caused a number of segments of the television program to be hidden and has indicated that no additional segments are to be filtered. In response, content filter component 420 may, as illustrated in FIG. 8H, cause a graphical user interface 840 to be provided to the user indicating that the television program has been successfully filtered.

Now assume that at some later point in time, the user indicates a desire to restore a television program by, for example, selecting the restore a television program option in graphical user interface 810 of FIG. 8B. In response, digital video recorder 210 may retrieve a list of filtered television programs and may provide the list of filtered television programs in a graphical user interface 845, as illustrated in FIG. 8I. Assume that the user selects item 1 from the list using remote control 230. In response, digital video recorder 210 may retrieve a list of segments that have been filtered from the selected television program and cause the list of segments to be provided to the user via a graphical user interface 850, as illustrated in FIG. 8J. As illustrated in FIG. 8J, two segments were filtered from the television program—a segment from 17 minutes to 19 minutes into the television program and a segment from 24 minutes to 27 minutes into the television program. As further illustrated in FIG. 8J, each segment may be associated with a video clip that allows the user to view the segment to be restored.

In this example, assume that the user elects to restore the segment from 17 minutes to 19 minutes into the television program. In response, digital video recorder 210 may cause a graphical user interface 855 to be provided to the user, as illustrated in FIG. 8K, indicating that the segment has been successfully restored.

Embodiments described herein allow users to filter segments from television programming and to restore segments filtered from television programming.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 5-7, the order of the acts may be varied in other exemplary embodiments. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a digital video recorder to:
      provide, for presentation, a list of television programs, the list of television programs being recorded by the digital video recorder,
      receive, from a user, selection of a television program in the list of television programs,
      receive, from the user, information identifying a segment to be filtered from the selected television program,
      receive, from the user, an indication that the segment is to be hidden from the selected television program,
      create a filtered television program based on the received indication,
         the segment not being played when the filtered television program is played, and
         the digital video recorder, when creating the filtered television program, being to:
            insert a first skip marker into the selected television program at a beginning of the segment, and
            insert a second skip marker into the selected television program at an end of the segment, and
         store the filtered television program.

2. The system of claim 1, where the digital video recorder is to:
   create the list of television programs based on one or more user-defined parameters, and
   when providing the list of television programs, the digital video recorder is to:
      provide the created list of television programs.

3. The system of claim 2, where the one or more user-defined parameters include at least one of:
   information identifying a television program rating, information identifying a television channel, or
   information identifying a type of television program content.

4. The system of claim 1, where the digital video recorder is further to:
   mark the segment as hidden.

5. The system of claim 1, where the digital video recorder is further to:
   receive information indicating that the segment is to be restored, and
   remove, based on the received information, the first skip marker and the second skip marker from the selected television program.

6. The system of claim 1, where the digital video recorder is further to:
   receive information indicating that the filtered television program is to be played, and
   cause, based on the received information, the filtered television program to be provided for display.

7. The system of claim 1, where the digital video recorder is further to:
   receive a personal identification number,
   determine whether the received personal identification number matches a stored personal identification number, and
   allow the segment to be marked as hidden or deleted when the received personal identification number matches a stored personal identification number.

8. The system of claim 1, where the digital video recorder is further to:
   mark the segment as hidden,
   receive information indicating that the marked segment is to be restored, and
   cause, based on the received information, the marked segment to be played when the selected television program is played.

9. A method comprising:
   providing, by a device and for presentation, a list of television programs, the list of television programs being recorded by the device;
   receiving, by the device and from a user, selection of a television program in the list of television programs;
   receiving, by the device and from the user, information identifying a start of a segment to be filtered from the selected television program;
   receiving, by the device and from the user, information identifying an end of the segment to be filtered from the selected television program;
   receiving, by the device and from the user, an indication to hide the segment;
      creating, by the device, a filtered television program based on the received indication, the segment not being played when the filtered television program is played, and
      creating the filtered television program including:
         inserting a first skip marker into the selected television program at the start of the segment; and
         inserting a second skip marker into the selected television program at the end of the segment; and
   storing, by the device, the filtered television program.

10. The method of claim 9, where the method includes:
   creating the list of television programs based on one or more user-defined parameters, and
   when providing the list of television programs, the method includes:
      providing the created list of television programs.

11. The method of claim 10, where the one or more user-defined parameters include at least one of:
information identifying a television program rating,
information identifying a television channel, or
information identifying a type of television program content.

12. The method of claim 9, further comprising:
receiving information indicating that the segment is to be restored; and
removing the first skip marker and the second skip marker from the selected television program to create a restored television program,
the removing causing the segment to be played when the restored television program is played.

13. The method of claim 12, further comprising:
receiving a personal identification number; and
determining whether the received personal identification number matches a stored personal identification number,
where, when removing the first skip marker and the second skip marker from the selected television program, the method includes:
removing the first skip marker and the second skip marker from the selected television program when the received personal identification number matches the stored personal identification number.

14. The method of claim 9, further comprising:
receiving a personal identification number; and
determining whether the received personal identification number matches a stored personal identification number,
where, when inserting the first skip marker and the second skip marker into the selected television program, the method includes:
inserting the first skip marker and the second skip marker when the received personal identification number matches the stored personal identification number.

15. The method of claim 9, further comprising:
receiving selection of a second television program in the list of television programs;
receiving information identifying a start of a second segment to be filtered from the selected second television program;
receiving information identifying an end of the second segment to be filtered from the selected second television program;
permanently deleting the second segment from the selected second television program, based on the information identifying the start of the second segment to be filtered from the selected second television program and the information identifying the end of the second segment to be filtered from the selected second television program, to create a filtered second television program;
storing the filtered second television program.

16. One or more non-transitory computer readable media storing instructions, the instructions comprising:
one or more instructions, which, when executed by a device, cause the device to:
receive selection of a television program,
the television program being recorded by the device;
receive, from a user, information identifying a start of a segment of the television program,
the segment being less than an entire portion of the television program;
receive, from the user, information identifying an end of the segment of the television program;
provide, for presentation, a graphical user interface that allows the user to indicate whether to hide or delete the segment;
receive, from the user, an indication that the segment should be deleted;
insert, based on the received information identifying the start of the segment and the received indication, a first marker into the television program at the start of the segment;
insert, based on the received information identifying the end of the segment and the received indication, a second marker into the television program at the end of the segment; and
delete, based on the inserted first marker and the inserted second marker, the segment from the television program.

17. The non-transitory computer readable media of claim 16, where the instructions further include:
one or more instructions to store at least one of:
the television program including the inserted first marker and the inserted second marker, or
the television program after the segment has been deleted segment.

18. The non-transitory computer readable media of claim 16, where the instructions further include:
one or more instructions to:
provide a list of segments that have been hidden from a second television program;
receive selection of a first segment in the list of segments;
remove markers associated with the first segment to cause the first segment to be played when the second television program is played; and
store the second television program after removing the markers associated with the first segment.

19. The non-transitory computer readable media of claim 18, where the instructions further include:
one or more instructions to:
receive a personal identification number; and
determine whether the received personal identification number matches a stored personal identification number,
where the one or more instructions to remove the markers associated with the first segment include:
one or more instructions to remove the markers associated with the first segment when the received personal identification number matches a stored personal identification number.

20. The non-transitory computer readable media of claim 16, where the instructions further include:
one or more instructions to:
receive a personal identification number; and
determine whether the received personal identification number matches the stored personal identification number,
where
the one or more instructions to insert the first marker into the television program include:
one or more instructions to insert the first marker into the television program when the received personal identification number matches a stored personal identification number,
the one or more instructions to insert the second marker into the television program include:
one or more instructions to insert the second marker into the television program when the received personal identification number matches the stored personal identification number, and the one or more instructions to delete the segment from the television program include:
one or more instructions to delete the segment from the television program when the received personal identification number matches a stored personal identification number.

* * * * *